US012738426B2

(12) United States Patent
Park et al.

(10) Patent No.: US 12,738,426 B2
(45) Date of Patent: Sep. 15, 2026

(54) CAPACITOR AND METHOD FOR MANUFACTURING THE SAME

(71) Applicant: SAMSUNG ELECTRO-MECHANICS CO., LTD., Suwon-si (KR)

(72) Inventors: Jihoon Park, Suwon-si (KR); Jungsub Choi, Suwon-si (KR); Kwangmook Lee, Suwon-si (KR); Jun-Goo Won, Suwon-si (KR); A Young Choi, Suwon-si (KR); Gwangpyo Park, Suwon-si (KR); Hyungoo Jeon, Suwon-si (KR)

(73) Assignee: SAMSUNG ELECTRO-MECHANICS CO. LTD., Suwon-si (KR)

( * ) Notice: Subject to any disclaimer, the term of this patent is extended or adjusted under 35 U.S.C. 154(b) by 90 days.

(21) Appl. No.: 18/435,483

(22) Filed: Feb. 7, 2024

(65) Prior Publication Data

US 2025/0062075 A1 Feb. 20, 2025

(30) Foreign Application Priority Data

Aug. 18, 2023 (KR) ........................ 10-2023-0108384

(51) Int. Cl.

*H01G 4/30* (2006.01)
*H01G 4/012* (2006.01)
*H01G 4/10* (2006.01)
*H01G 4/228* (2006.01)
*H01G 4/38* (2006.01)

(52) U.S. Cl.

CPC ............... *H01G 4/30* (2013.01); *H01G 4/012* (2013.01); *H01G 4/228* (2013.01); *H01G 4/38* (2013.01); *H01G 4/10* (2013.01)

(58) Field of Classification Search

CPC .......... H01G 4/30; H01G 4/012; H01G 4/228; H01G 4/38; H01G 4/10

See application file for complete search history.

(56) References Cited

U.S. PATENT DOCUMENTS 10,181,461 B1 * 1/2019 Park ......................... H01G 4/33
2009/0000093 A1 * 1/2009 Sasaki ...................... H01G 4/38 361/321.1
2009/0039465 A1 2/2009 Chinthakindi et al.

(Continued)

FOREIGN PATENT DOCUMENTS

KR 10-2016-0133031 A 11/2016

OTHER PUBLICATIONS

The Extended European Search Report dated Sep. 16, 2024 issued in European Patent Application No. 24164510.0.

(Continued)

*Primary Examiner* — Michael P McFadden

(74) *Attorney, Agent, or Firm* — Morgan, Lewis & Bockius LLP

(57) ABSTRACT

A capacitor may include a substrate, a first capacitor portion disposed on the substrate, and a second capacitor portion disposed on the first capacitor portion. The first capacitor portion may include a first insulation layer having a plurality of trenches, a first electrode disposed on the first insulation layer and in the plurality of trenches, a dielectric layer disposed on the first electrode, and a second electrode disposed on the dielectric layer.

20 Claims, 11 Drawing Sheets

(56) References Cited

U.S. PATENT DOCUMENTS

| | | | | |
|---|---|---|---|---|
| 2016/0268144 | A1* | 9/2016 | Voiron | H01L 21/02258 |
| 2016/0336311 | A1 | 11/2016 | Kim | |
| 2017/0141115 | A1* | 5/2017 | Bower | H10D 84/217 |
| 2018/0308638 | A1* | 10/2018 | Ryou | H01G 4/33 |
| 2022/0190102 | A1* | 6/2022 | Huang | H01G 4/008 |
| 2022/0223585 | A1* | 7/2022 | Kim | H01L 25/105 |
| 2025/0174408 | A1* | 5/2025 | Kim | H01G 4/385 |

OTHER PUBLICATIONS

Korean Office Action dated Jun. 26, 2024 issued in Korean Patent Application No. 10-2023-0108384 (with English translation).

Korean Final Office Action dated Feb. 7, 2025 issued in Korean Patent Application No. 10-2023-0108384 (with English translation).

Notice of Allowance issued on Nov. 19, 2025 in Korean Patent Application No. 10-2023-0108384 with English translation.

* cited by examiner

CAPACITOR AND METHOD FOR MANUFACTURING THE SAME

CROSS-REFERENCE TO RELATED APPLICATION

This application claims priority to and the benefit of Korean Patent Application No. 10-2023-0108384 filed in the Korean Intellectual Property Office on Aug. 18, 2023, the entire contents of which is incorporated herein by reference.

TECHNICAL FIELD

The present disclosure relates to a capacitor and a method for manufacturing the same.

BACKGROUND

Electronic components used in electronic devices include capacitors, inductors, piezoelectric elements, varistors, or thermistors. A multilayer capacitor among such ceramic electronic devices may be used in various electronic devices due to the merit of small size, high capacity, and easy mounting.

For example, multilayer capacitor may be used in a condenser in the form of a chip that is mounted on a substrate of various electronic products such as an image device such as a liquid crystal display device (LCD), a plasma display device panel (PDP), an organic light emitting diode (OLED), or the like, a computer, a personal portable terminal, and a smart phone, and serves to charge or discharge electricity.

With the recent trend toward miniaturization and thinning of electronic products, demand for capacitors with higher capacity than existing multilayer capacitors is increasing.

SUMMARY

The present disclosure attempts to provide a capacitor having a high capacity and a method for manufacturing the same.

However, the objective of the present disclosure is not limited to the aforementioned one, and may be extended in various ways within the spirit and scope of the present disclosure.

A capacitor may include a substrate, a first capacitor portion disposed on the substrate, and a second capacitor portion disposed on the first capacitor portion. The first capacitor portion may include a first insulation layer having a plurality of trenches, a first electrode disposed on the first insulation layer and in the plurality of trenches, a dielectric layer disposed on the first electrode, and a second electrode disposed on the dielectric layer.

The second capacitor portion may include a second insulation layer disposed on the first capacitor portion, a first plate-shaped electrode disposed inside the second insulation layer, and having a plate-shaped structure, a second plate-shaped electrode disposed inside the second insulation layer, and having a plate-shaped structure, and a plate-shape dielectric layer disposed between the first plate-shaped electrode and the second plate-shaped electrode.

The first plate-shaped electrode may cover the plurality of trenches.

The capacitor may further include an interlayer connection portion connecting the first plate-shaped electrode and the second electrode.

Two first plate-shaped electrodes may be provided, and positioned spaced apart from each other, and the interlayer connection portion may be positioned between one positioned adjacent to the substrate among the two first plate-shaped electrodes and the second electrode.

The second plate-shaped electrode may be positioned between the two first plate-shaped electrodes.

Two second plate-shaped electrode may be provided, and positioned spaced apart from each other.

The two second plate-shaped electrodes may be connected by an electrode connection portion.

The first plate-shaped electrode and the second plate-shaped electrode may be provided in a plural quantity, and stacked interposing the plate-shaped dielectric layer.

The capacitor may further include a first external electrode disposed on the second insulation layer, and connected to the first electrode and the second plate-shaped electrode, and a second external electrode disposed on the second insulation layer, and connected to the second electrode and the first plate-shaped electrode.

The capacitor may further include a first external connection portion connecting the first external electrode and the second plate-shaped electrode, and a second external connection portion connecting the second external electrode and the first plate-shaped electrode.

The capacitor may further may include a conductive layer disposed within the first insulation layer, and connected to the first electrode.

The first external connection portion may be connected to the conductive layer.

The first capacitor portion may be disposed between the conductive layer and the second capacitor portion.

A plurality of first capacitor portions may be disposed on the substrate in different regions, and at least one second capacitor portion may be disposed on each of the first capacitor portions.

The capacitor may further include a conductive layer disposed within the first insulation layer, and connected to all of the first electrodes included in the plurality of first capacitor portions.

The capacitor may further include a plurality of first external electrodes disposed on the second capacitor portion, a plurality of second external electrodes disposed on the second capacitor portion, and a plurality of first external connection portions connected to each of the conductive layer and the plurality of first external electrodes by directly contacting.

Each of a plurality of second capacitor portions may be connected to at least one of the plurality of second external electrodes.

A method for manufacturing a capacitor may include forming a first insulation layer on a substrate, forming a trench in the first insulation layer, forming a first capacitor portion by forming a first electrode, a dielectric layer, and a second electrode in the trench, and forming a second capacitor portion having a first plate-shaped electrode and a second plate-shaped electrode inside a second insulation layer on the first capacitor portion.

The first plate-shaped electrode and the second plate-shaped electrode may be formed by a deposition process.

According to at least one of embodiments, a capacitor having a high capacity and a method for manufacturing the same may be provided.

DETAILED DESCRIPTION OF THE EMBODIMENTS

Figure 1:
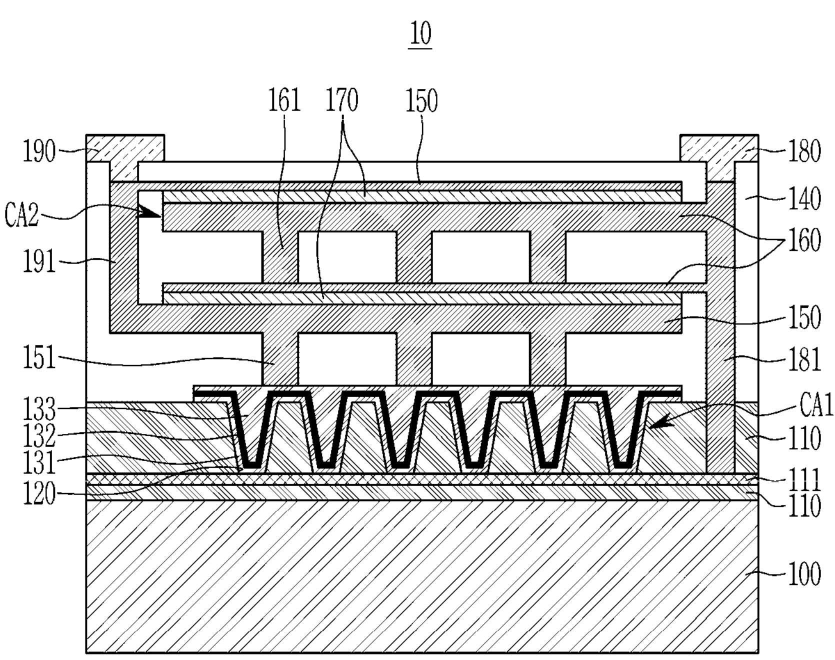
FIG. 1 is a drawing showing a capacitor according to an embodiment.

The present disclosure will be described more fully hereinafter with reference to the accompanying drawings, in which embodiments of the disclosure are shown. In order to clearly describe the present disclosure, parts or portions that are irrelevant to the description are omitted, and identical or similar constituent elements throughout the specification are denoted by the same reference numerals. In addition, some constituent elements are exaggerated, omitted, or briefly illustrated in the added drawings, and sizes of the respective constituent elements do not reflect the actual sizes.

Further, the accompanying drawings are provided for helping to easily understand exemplary embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including ordinal numbers such as first, second, and the like will be used only to describe various components, and are not interpreted as limiting these components. The terms are only used to differentiate one component from others.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

In addition, throughout the specification, "connected" means that two or more components are not only directly connected, but two or more components may be connected indirectly through other components, physically connected as well as being electrically connected, or it may be referred to by different names depending on the location or function, but may mean integral.

Throughout the specification, the substrate 100 may have a structure that is wide in a plan view and thin in a cross-sectional view, 'the planar direction of the substrate 100' may indicate a direction parallel to the wide and flat surface of the substrate 100, and the 'thickness direction of the substrate 100' may indicate a direction that is perpendicular to a wide and flat surface of the substrate 100.

FIG. 1 is a drawing showing a capacitor according to an embodiment.

Referring to FIG. 1, a capacitor 10 according to an embodiment may include the substrate 100, a first capacitor portion CA1 and a second capacitor portion CA2, a first external electrode 180 and a second external electrode 190.

The substrate 100 has a predetermined area. The substrate 100 is provided as an insulation material. For example, the substrate 100 may be silicon substrate.

The first capacitor portion CA1 is disposed on the substrate 100. The first capacitor portion CA1 may include a first insulation layer 110, a first electrode 131, a dielectric layer 132, a second electrode 133.

The first insulation layer 110 is disposed on the substrate 100. The first insulation layer 110 has a predetermined thickness. The thickness of the first insulation layer 110 may be 1.8 μm to 2.2 μm. The first insulation layer 110 may be a silicon oxide ($SiO_2$) layer. A conductive layer 111 is disposed in the first insulation layer 110. The conductive layer 111 may have a plate-shaped structure. The conductive layer 111 may be provided as a metal material.

A plurality of trenches 120 are formed in the first insulation layer 110. A lower end of a trench 120 may be connected to the conductive layer 111. That is, before the trench 120 is filled, the conductive layer 111 may be exposed to the outside through the trench 120.

The first electrode 131 is disposed on the first insulation layer 110 of a region where the trench 120 is formed. That is, the first electrode 131 may be disposed on the trench 120. In addition, the first electrode 131 may be disposed on the first insulation layer 110 between the adjacently positioned trenches 120. The first electrode 131 may be made of a metal material. The first electrode 131 is connected to the conductive layer 111. The first electrode 131 may be structured to directly contact the conductive layer 111, and may be connected to the conductive layer 111.

The dielectric layer 132 is disposed on the first electrode 131. That is, the dielectric layer 132 may be disposed on the first electrode 131 of the trench 120. In addition, the dielectric layer 132 may be disposed on the first electrode 131 between the adjacent trenches 120. The dielectric layer 132 may be formed as a ZAZ, which is a $ZrO_2$—$Al_2O_3$—$ZrO_2$ composite layer. In addition, the dielectric layer 132 may be formed one of metal oxides such as $Al_2O_3$, $ZrO_2$, and $HfO_2$. In addition, the dielectric layer 132 may be formed as a combination of metal oxides such as $Al_2O_3$, $ZrO_2$, and $HfO_2$.

The second electrode 133 is disposed on the dielectric layer 132. That is, the second electrode 133 may be disposed on the dielectric layer 132 of the trench 120. In addition, the second electrode 133 may be disposed on the dielectric layer 132 between the adjacent trenches 120. The second electrode 133 is formed to fill an interior of the trench 120, and thereby voids may be prevented from generating in the interior of the trench 120. The second electrode 133 may be metal material. The second electrode 133 faces the first electrode 131 interposing the dielectric layer 132.

The second capacitor portion CA2 is disposed on the first capacitor portion CA1. The second capacitor portion CA2 includes a second insulation layer 140, a first plate-shaped electrode 150, a second plate-shaped electrode 160 and a plate-shape dielectric layer 170.

The second insulation layer 140 is disposed on the first capacitor portion CA1. The second insulation layer 140 may cover the second electrode 133. In addition, the second insulation layer 140 may cover the first insulation layer 110 in a region other than a region where the second electrode 133 is disposed. The second insulation layer 140 may be a silicon oxide ($SiO_2$) layer.

The first plate-shaped electrode 150 is disposed inside the second insulation layer 140. The first plate-shaped electrode 150 may have a plate-shaped structure having a predetermined area. Two first plate-shaped electrodes 150 may be positioned to be spaced apart in a vertical direction. The first plate-shaped electrode 150 positioned adjacent to the substrate 100 among the two first plate-shaped electrodes 150 may be positioned to face the second electrode 133 in the vertical direction, and may be connected to the second electrode 133 through an interlayer connection portion 151. The interlayer connection portion 151 may be positioned between the first plate-shaped electrode 150 and the second electrode 133. The interlayer connection portion 151 is positioned to penetrate the second insulation layer 140 between the first plate-shaped electrode 150 and the second electrode 133, such that both ends may be connected to each of the first plate-shaped electrode 150 and the second electrode 133, by directly contacting. The interlayer connection portion 151 may be positioned in a plural quantity between the first plate-shaped electrode 150 and the second electrode 133. The interlayer connection portion 151 may be provided as a via structure.

The second plate-shaped electrode 160 is positioned inside the second insulation layer 140. The second plate-shaped electrode 160 may have a plate-shaped structure having a predetermined area. The second plate-shaped electrode 160 may be positioned between two first plate-shaped electrodes 150. Two second plate-shaped electrodes 160 may be positioned to be spaced apart in the vertical direction. The two second plate-shaped electrodes 160 may be connected to each other through an electrode connection portion 161. The electrode connection portion 161 may be positioned between the second plate-shaped electrodes 160. That is, the electrode connection portion 161 is positioned to penetrate the second insulation layer 140 between two second plate-shaped electrodes 160, and may be respectively connected to the two second plate-shaped electrodes 160 of which both ends are positioned to be spaced apart from each other. The electrode connection portion 161 may be positioned in a plural quantity between the two second plate-shaped electrodes 160. The electrode connection portion 161 may be provided as a via structure.

The plate-shape dielectric layer 170 is positioned between the first plate-shaped electrode 150 and the second plate-shaped electrode 160. The plate-shape dielectric layer 170 may be formed as a ZAZ, which is a $ZrO_2$—$Al_2O_3$—$ZrO_2$ composite layer. In addition, the plate-shape dielectric layer 170 may be formed one of metal oxides such as $Al_2O_3$, $ZrO_2$, and $HfO_2$. In addition, the plate-shape dielectric layer 170 may be formed as a combination of metal oxides such as $Al_2O_3$, $ZrO_2$, and $HfO_2$. The plate-shape dielectric layer 170 may be provided as the same material as the dielectric layer 132.

The first external electrode 180 is connected to the first electrode 131 and the second plate-shaped electrode 160. The first external electrode 180 may be disposed on the second capacitor portion CA2. The first external electrode 180 is disposed on the second insulation layer 140, and has at least a portion exposed to the outside. The first external electrode 180 may be connected to the first electrode 131 and the second plate-shaped electrode 160 through a first external connection portion 181. The first external connection portion 181 is positioned to penetrate the first insulation layer 110 and the second insulation layer 140 between the first external electrode 180 and the conductive layer 111, such that both ends may be each connected to the conductive layer 111 and the first external electrode 180. The second plate-shaped electrode 160 may be connected to the first external connection portion 181, by directly contacting. The second plate-shaped electrode 160 may be connected to the first external connection portion 181 in an outer side of a region facing the first plate-shaped electrode 150 interposing the plate-shape dielectric layer 170. The first electrode 131 is connected to the first external connection portion 181 through the conductive layer 111. The first external connection portion 181 may be provided as a via structure spanning the first insulation layer 110 and the second insulation layer 140.

The second external electrode 190 is connected to the second electrode 133 and the first plate-shaped electrode 150. The second external electrode 190 may be disposed on the second capacitor portion CA2. The second external electrode 190 is disposed on the second insulation layer 140, and has at least a portion exposed to the outside. The second external electrode 190 may be connected to the first plate-shaped electrode 150 through a second external connection portion 191. The second external connection portion 191 is positioned to penetrate a partial section of the second insulation layer 140, and may be connected to the second external electrode 190 and to each of the first plate-shaped electrode 150, by directly contacting. At this time, the first plate-shaped electrode 150 may be connected to the second external connection portion 191 in an outer side of a region facing the second plate-shaped electrodes 160 interposing the plate-shape dielectric layer 170. The second electrode 133 is connected to the second external electrode 190 through the first plate-shaped electrode 150. The second external connection portion 191 may be provided as a via structure.

The capacitor 10 according to an embodiment includes the first capacitor portion CA1 and the second capacitor portion CA2. Accordingly, the capacitor 10 has high-capacity.

FIG. 2 to FIG. 9 are drawings showing a manufacturing method of a capacitor according to an embodiment.

Hereinafter, a manufacturing method of the capacitor 10 according to an embodiment will be described in detail with reference to FIG. 2 to FIG. 8.

Figure 2:
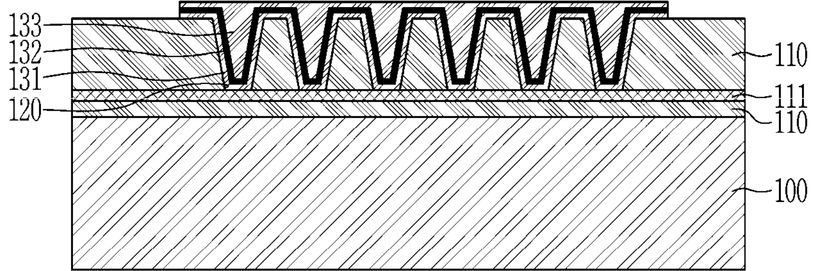
FIG. 2 to FIG. 9 are drawings showing a manufacturing method of a capacitor according to an embodiment.

Referring to FIG. 2, the first capacitor portion CA1 on the substrate 100 is formed. Specifically, the first insulation layer 110, the conductive layer 111, and the first insulation layer 110 are alternately formed on the substrate 100. The first insulation layer 110 and the conductive layer 111 may be formed through a deposition process. A chemical vapor deposition (CVD), an atomic layer deposition (ALD), or the like may be used for forming the first insulation layer 110. A chemical vapor deposition (CVD), an atomic layer deposition (ALD), or the like may be used for forming the conductive layer 111.

Thereafter, the trench 120 is formed in the first insulation layer 110. The trench 120 may be formed through an etching process. The etching process may be performed by using a mask. The mask may be formed through a photoresist.

Thereafter, the first electrode 131 is formed on the first insulation layer 110. The first electrode 131 may be formed through a deposition process. A chemical vapor deposition (CVD), an atomic layer deposition (ALD), or the like may be used for deposition of the first electrode 131.

Thereafter, the dielectric layer 132 is formed on the first electrode 131. The dielectric layer 132 may be formed through a deposition process. A chemical vapor deposition (CVD), an atomic layer deposition (ALD), or the like may be used for deposition of the dielectric layer 132.

Thereafter, the second electrode 133 is formed on the dielectric layer 132. The second electrode 133 may be formed through a deposition process. A chemical vapor deposition (CVD), an atomic layer deposition (ALD), or the like may be used for deposition of the second electrode 133.

Figure 3:
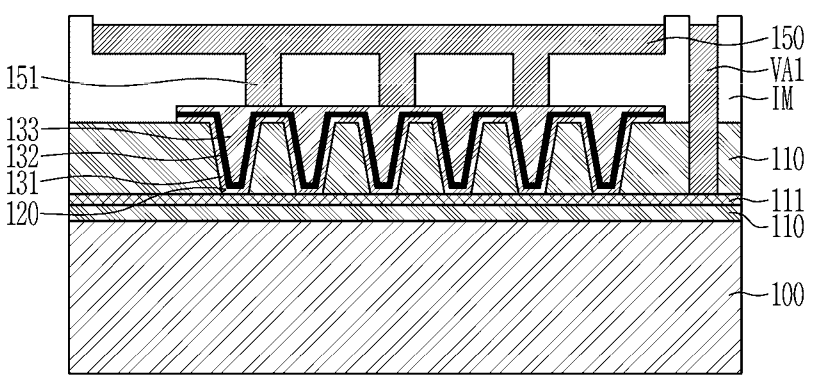

Referring to FIG. 3, a portion IM of the second insulation layer 140 is formed on the first capacitor portion CA1. In addition, the interlayer connection portion 151, the first plate-shaped electrode 150, and a portion VA1 of the second external connection portion 191 is formed in a portion IM of the second insulation layer 140. The second insulation layer 140 may be formed through a deposition process. A chemical vapor deposition (CVD), an atomic layer deposition (ALD), or the like may be used for forming the second insulation layer 140.

The interlayer connection portion 151, the first plate-shaped electrode 150, and the portion VA1 of the second external connection portion 191 may be formed through a deposition process after etching the second insulation layer 140. The etching process may be performed by using a mask. The interlayer connection portion 151, the first plate-shaped electrode 150, and the portion VA1 of the second external connection portion 191 may be formed by a chemical vapor deposition (CVD), an atomic layer deposition (ALD), or the like.

Figure 4:
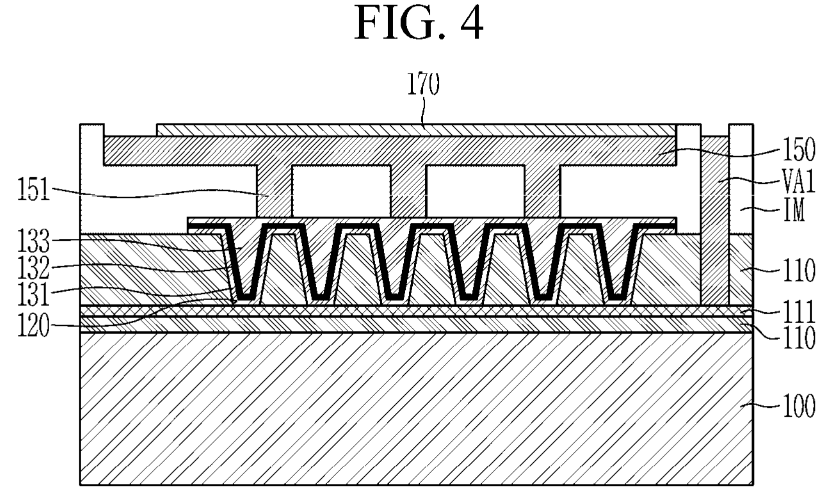

Referring to FIG. 4, the plate-shape dielectric layer 170 is formed on the first plate-shaped electrode 150. The plate-shape dielectric layer 170 may be formed through a deposition process. Deposition process of the plate-shape dielectric layer 170 may be performed by a chemical vapor deposition (CVD), an atomic layer deposition (ALD), or the like. The plate-shape dielectric layer 170 is not deposited in some region of the first plate-shaped electrode 150. The region in the first plate-shaped electrode 150 where the plate-shape dielectric layer 170 is not deposited may be disposed outer side end portion.

Figure 5:
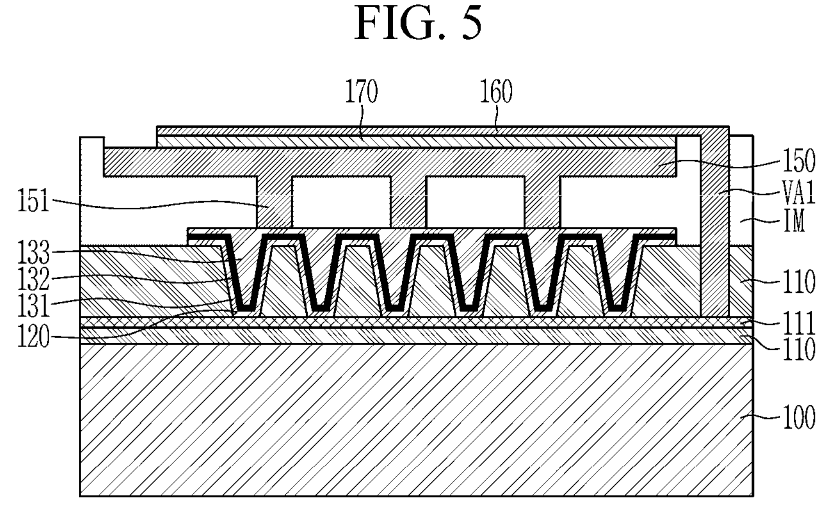

Referring to FIG. 5, the second plate-shaped electrode 160 is formed on the plate-shape dielectric layer 170. In addition, the portion VA1 of the first external connection portion 181 may be additionally formed. The second plate-shaped electrode 160, the first external connection portion 181 may be formed through a deposition process. The deposition process of the second plate-shaped electrode 160 and the first external connection portion 181 may be performed by a chemical vapor deposition (CVD), an atomic layer deposition (ALD), or the like. The second plate-shaped electrode 160 is formed to contact a portion VA1 of the first external connection portion 181.

Figure 6:
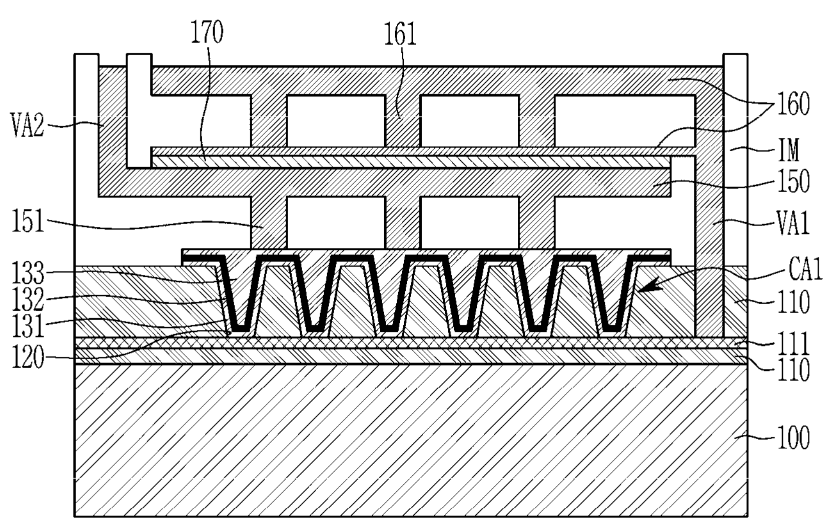

Referring to FIG. 6, a portion of the second insulation layer 140 is additionally formed. In addition, the electrode connection portion 161, the second plate-shaped electrode 160, the portion VA1 of the first external connection portion 181 are formed in the additionally formed second insulation layer 140. In addition, a portion VA2 of the second external connection portion 191 is additionally formed. The second insulation layer 140 may be formed through a deposition process. A chemical vapor deposition (CVD), an atomic layer deposition (ALD), or the like may be used for forming the second insulation layer 140.

The electrode connection portion 161, the second plate-shaped electrode 160, the portion VA1 of the first external connection portion 181, and the portion VA2 of the second external connection portion 191 may be formed through a deposition process after etching the second insulation layer 140. The etching process may be performed by using a mask. The deposition process of the electrode connection portion 161, the second plate-shaped electrode 160, the first external connection portion 181, and the second external connection portion 191 may be performed by a chemical vapor deposition (CVD), an atomic layer deposition (ALD), or the like. The second plate-shaped electrode 160 is formed to be connected to the portion VA1 of the first external connection portion 181. The portion VA2 of the second external connection portion 191 is formed to be connected to the first plate-shaped electrode 150.

Figure 7:
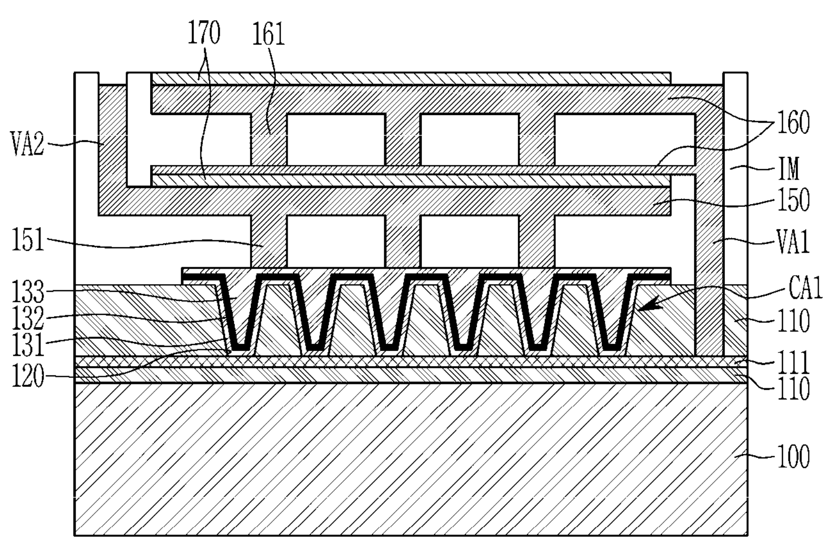

Referring to FIG. 7, the plate-shape dielectric layer 170 is formed on the second plate-shaped electrode 160. The plate-shape dielectric layer 170 may be formed through a deposition process. Deposition process of the plate-shape dielectric layer 170 may be performed by a chemical vapor deposition (CVD), an atomic layer deposition (ALD), or the like. The plate-shape dielectric layer 170 is not deposited in some region of the second plate-shaped electrode 160. The region in the second plate-shaped electrode 160 where the plate-shape dielectric layer 170 is not deposited may be positioned on an outer side end portion connected to the portion VA1 of the second external connection portion 191.

Figure 8:
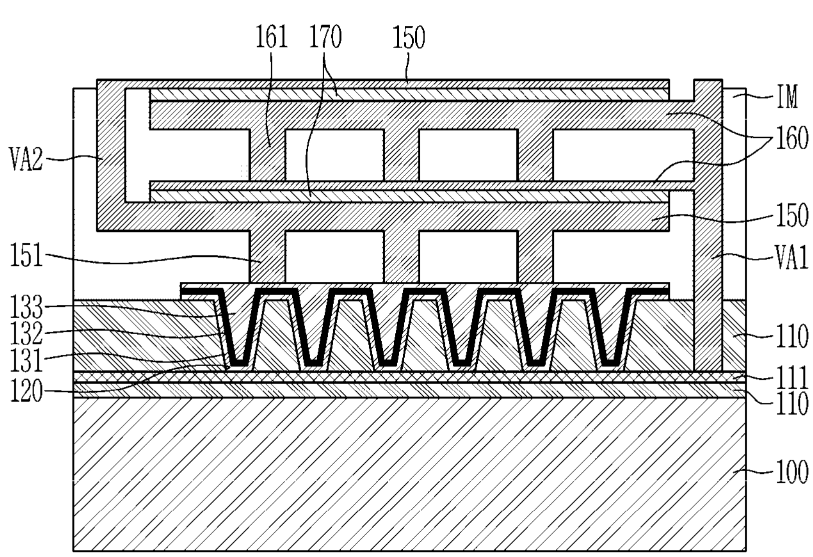

Referring to FIG. 8, the first plate-shaped electrode 150 is formed on the plate-shape dielectric layer 170. In addition, the portion VA1 of the first external connection portion 181 may be additionally formed. The first plate-shaped electrode 150, the portion VA1 of the first external connection portion 181 may be formed through a deposition process. The deposition process of the first plate-shaped electrode 150, the portion VA1 of the first external connection portion 181 may be performed by a chemical vapor deposition (CVD), an atomic layer deposition (ALD), or the like. The first plate-shaped electrode 150 is formed to contact a portion VA2 of a second external connection portion 181.

Figure 9:
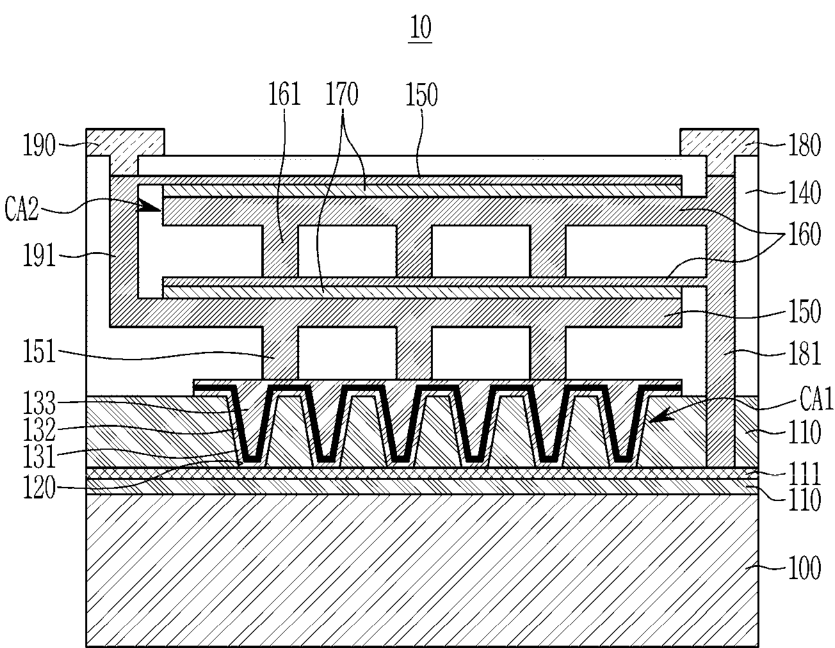

Referring to FIG. 9, another portion of the second insulation layer 140 is additionally formed. In addition, the first external electrode 180 and the second external electrode 190 are formed on the second insulation layer 140. The second insulation layer 140 may be formed through a deposition process. A chemical vapor deposition (CVD), an atomic layer deposition (ALD), or the like may be used for forming the second insulation layer 140. Thereafter, the first external electrode 180 is formed to be connected to the first external connection portion 181, and the second external electrode 190 is formed to be connected to the second external connection portion 191. Prior to forming the first external electrode 180 and the second external electrode 190, the second insulation layer 140 may be etched so as to expose the first external connection portion 181 and the second external connection portion 191. In addition, prior to forming the first external electrode 180 and the second external electrode 190, a portion of the first external connection portion 181 and a portion of the second external connection portion 191 may be additionally formed. The first external electrode 180, the second external electrode 190 may be formed by a deposition process. Deposition of the first external electrode 180 and the second external electrode 190 may be performed by a chemical vapor deposition (CVD), an atomic layer deposition (ALD), plating, or the like.

Figure 10:
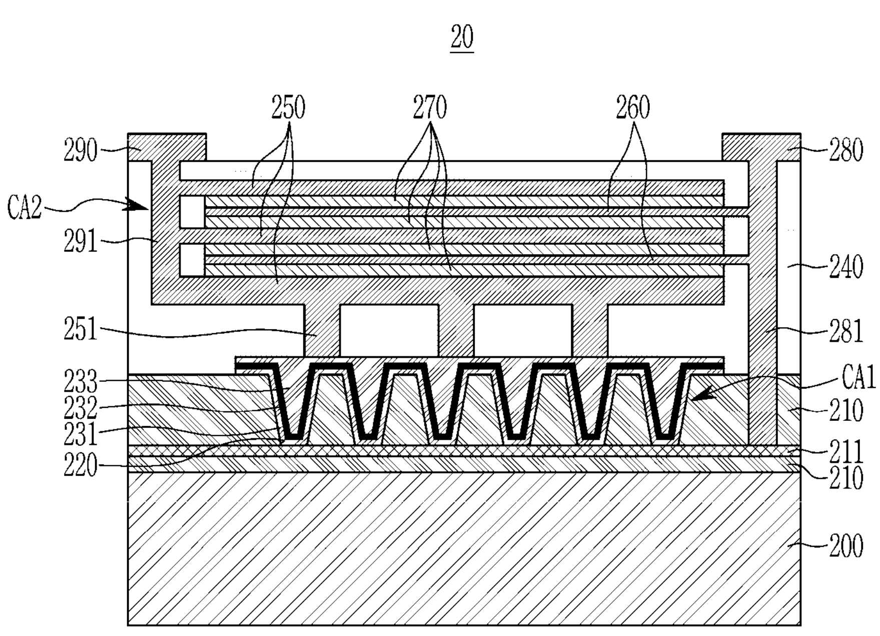
FIG. 10 is a drawing showing a capacitor according to another embodiment.

FIG. 10 is a drawing showing a capacitor according to another embodiment.

Referring to FIG. 10, a capacitor 20 according to another embodiment may include a substrate 200, the first capacitor portion CA1, the second capacitor portion CA2, a first external electrode 280 and a second external electrode 290.

The substrate 200 has the predetermined area. The substrate 200 is provided as an insulation material. For example, the substrate 200 may be silicon substrate.

The first capacitor portion CA1 is disposed on the substrate 200. The first capacitor portion CA1 may include a first insulation layer 210, a first electrode 231, a dielectric layer 232, a second electrode 233.

The first electrode 231, the dielectric layer 232, and the second electrode 233 are disposed on a trench 220 formed in the first insulation layer 210. In addition, a conductive layer 211 is disposed in the first insulation layer 210.

Since the structure of the first capacitor portion CA1 is the same or similar to the first capacitor portion CA1 of the capacitor 10 described above in FIG. 1, repeated descriptions will be omitted.

The second capacitor portion CA2 is disposed on the first capacitor portion CA1. The second capacitor portion CA2 includes a second insulation layer 240, a first plate-shaped electrode 250, a second plate-shaped electrode 260 and a plate-shape dielectric layer 270.

The second insulation layer 240 is disposed on the first capacitor portion CA1. The second insulation layer 240 may cover the second electrode 233. In addition, the second insulation layer 240 may cover the first insulation layer 210 in a region other than a region where the second electrode 233 is positioned. The second insulation layer 240 may be a silicon oxide ($SiO_2$) layer.

The first plate-shaped electrode 250, the second plate-shaped electrode 260, and the plate-shape dielectric layer 270 are positioned inside the second insulation layer 240.

The first plate-shaped electrode 250 may have a plate-shaped structure having a predetermined area. The first plate-shaped electrode 250 may be provided in a plural quantity that are positioned spaced apart in the vertical direction. The first plate-shaped electrode 250 positioned most adjacent to the substrate 200 among a plurality of first plate-shaped electrodes 250 may be positioned to face the second electrode 233 in the vertical direction, and may be connected to the second electrode 233 through an interlayer connection portion 251. The interlayer connection portion 251 may be positioned between the first plate-shaped electrode 250 and the second electrode 233. That is, the interlayer connection portion 251 is positioned to penetrate the second insulation layer 240 between the first plate-shaped electrode 250 and the second electrode 233, such that both ends may be connected to each of the first plate-shaped electrode 250 and the second electrode 233. The interlayer connection portion 251 may be positioned in a plural quantity between the first plate-shaped electrode 250 and the second electrode 233. The interlayer connection portion 251 may be provided as a via structure.

The second plate-shaped electrode 260 is disposed on the inner side of the second insulation layer 240. The second plate-shaped electrode 260 may have a plate-shaped structure having a predetermined area. The second plate-shaped electrode 260 may be provided in a plural quantity that are positioned spaced apart in the vertical direction. The first plate-shaped electrode 250 and the second plate-shaped electrode 260 are stacked interposing the plate-shape dielectric layer 270. For example, the second plate-shaped electrode 260 may be stacked alternately with the first plate-shaped electrode 250, interposing the plate-shape dielectric layer 270. The plate-shape dielectric layer 270 may be formed as a ZAZ, which is a $ZrO_2$—$Al_2O_3$—$ZrO_2$ composite layer. In addition, the plate-shape dielectric layer 270 may be formed one of metal oxides such as $Al_2O_3$, $ZrO_2$, and $HfO_2$. In addition, the plate-shape dielectric layer 270 may be formed as a combination of metal oxides such as $Al_2O_3$, $ZrO_2$, and $HfO_2$. The plate-shape dielectric layer 270 may be provided as the same material as the dielectric layer 232.

The first external electrode 280 is connected to the first electrode 231 and the second plate-shaped electrode 260. The first external electrode 280 is disposed on the second insulation layer 240, and has at least a portion exposed to the outside. The first external electrode 280 may be connected to the first electrode 231 and the second plate-shaped electrode 260 through a first external connection portion 281. The first external connection portion 281 is positioned to penetrate the first insulation layer 210 and the second insulation layer 240 between the first external electrode 280 and the conductive layer 211, such that both ends may be each connected to the conductive layer 211 and the first external electrode 280. First side of the second plate-shaped electrode 260 may be connected to the first external connection portion 281, by directly contacting. The second plate-shaped electrode 260 may be connected to the first external connection portion 281 in an outer side of a region facing the first plate-shaped electrode 250 interposing the plate-shape dielectric layer 270. The first electrode 231 may be connected to the first external connection portion 281 through the conductive layer 211. The first external connection portion 281 may be provided as a via structure spanning the first insulation layer 210 and the second insulation layer 240.

A second external electrode 290 is connected to the second electrode 233 and the first plate-shaped electrode 250. The second external electrode 290 is disposed on the second insulation layer 240, and has at least a portion exposed to the outside. The second external electrode 290 may be connected to the first plate-shaped electrode 250 through a second external connection portion 291. The second external connection portion 291 is positioned to penetrate a partial section of the second insulation layer 240, and may be connected to the second external electrode 290 and to each of the first plate-shaped electrode 250, by directly contacting. The first plate-shaped electrode 250 may be connected to the second external connection portion 291 in an outer side of a region facing the second plate-shaped electrodes 260 interposing the plate-shape dielectric layer 270. The second electrode 233 is connected to the second external electrode 290 through the first plate-shaped electrode 250. The second external connection portion 291 may be provided as via structure.

The capacitor 20 according to another embodiment includes the first capacitor portion CA1 and the second capacitor portion CA2. Accordingly, the capacitor 20 has high-capacity.

In addition, in the second capacitor portion CA2, the plurality of first plate-shaped electrodes 250 and the plurality of second plate-shaped electrodes 260 are stacked in a multi-layer structure, thereby providing a high capacity.

Figure 11:
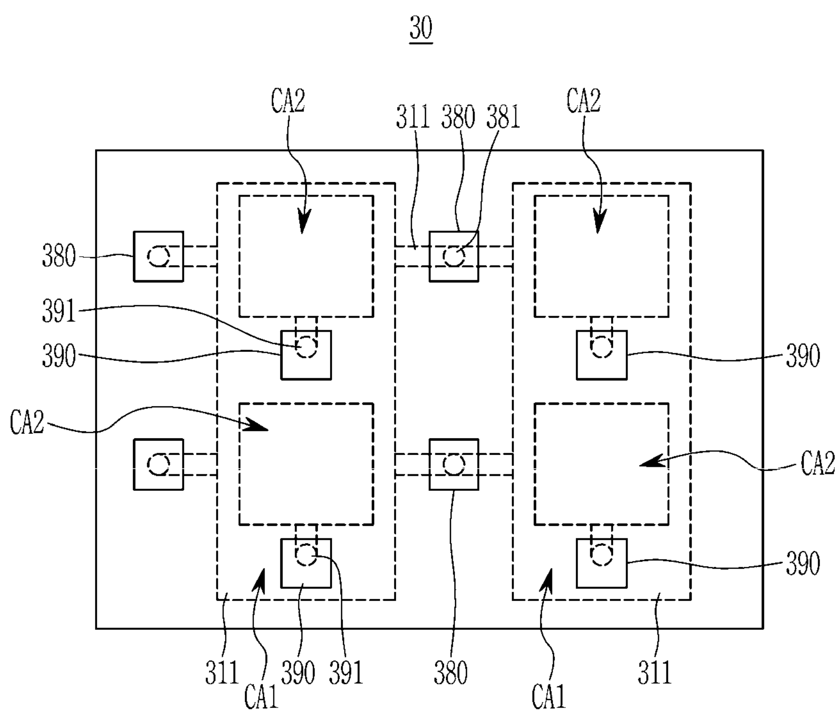
FIG. 11 is a drawing showing a capacitor according to still another embodiment.

FIG. 11 is a drawing showing a capacitor according to still another embodiment.

Referring to FIG. 11, a capacitor 30 according to still another embodiment includes the first capacitor portion CA1, the second capacitor portion CA2. The first capacitor portion CA1 is similar to or the same as the first capacitor portion CA1 included in the capacitor 10 of FIG. 1, and repeated descriptions will be omitted. In addition, the second capacitor portion CA2 is similar to or the same as the second capacitor portion CA2 included in the capacitor 10 of FIG.

1, or the second capacitor portion CA2 included in the capacitor 20 of FIG. 10, and repeated descriptions will be omitted.

Hereinafter, difference from the capacitor 10 of FIG. 1 or the capacitor 20 of FIG. 10 is described.

The capacitor 30 according to still another embodiment may include a plurality of first external electrodes 380 and a plurality of second external electrodes 390.

The first capacitor portion CA1 may be provided in a plural quantity, and positioned in different regions on substrate. In addition, a conductive layer 311 may be formed to be connected to all of the first electrodes 111 and 211 included in a plurality of first capacitor portions CA1. A plurality of first external connection portions 381 are connected to the conductive layer 311 in different regions. In addition, a first external electrode 380 is connected to each of the plurality of first external connection portions 381. At this time, at least one first external connection portion 381 and the first external electrode 380 may be connected to one first capacitor portion CA1. In addition, each of the plurality of first external connection portions 381 is connected to second plate-shaped electrodes 160 and 260 of the second capacitor portion CA2 that is adjacently positioned. The plurality of first external electrodes 380 is connected to each other through the conductive layer 311.

At least one second capacitor portion CA2 may be positioned on each of the first capacitor portions CA1. Each of the second capacitor portions CA2 may be connected to at least one second external connection portion 391. In addition, each of the second external connection portions 391 is connected to a second external electrode 390. Accordingly, different second capacitor portions CA2 have a parallel structure.

The capacitor 30 according to still another embodiment has the plurality of first external electrodes 380 and the plurality of second external electrodes 390. Accordingly, connection to external circuits may be variously adjusted.

While the present disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A capacitor, comprising:
- a substrate;
- a first capacitor portion disposed on the substrate; and
- a second capacitor portion disposed on the first capacitor portion, wherein the first capacitor portion comprises:
- a first insulation layer having a plurality of trenches;
- a first electrode disposed on the first insulation layer and in the plurality of trenches;
- a dielectric layer disposed on the first electrode; and
- a second electrode disposed on the dielectric layer.

2. The capacitor of claim 1, wherein the second capacitor portion comprises:
- a second insulation layer disposed on the first capacitor portion;
- a first plate-shaped electrode disposed inside the second insulation layer, and having a plate-shaped structure;
- a second plate-shaped electrode disposed inside the second insulation layer, and having a plate-shaped structure; and
- a plate-shape dielectric layer disposed between the first plate-shaped electrode and the second plate-shaped electrode.

3. The capacitor of claim 2, wherein the first plate-shaped electrode covers the plurality of trenches.

4. The capacitor of claim 2, further comprising an interlayer connection portion connecting the first plate-shaped electrode and the second electrode.

5. The capacitor of claim 4, wherein:
- two first plate-shaped electrodes are provided, and positioned spaced apart from each other; and
- the interlayer connection portion is positioned between one positioned adjacent to the substrate among the two first plate-shaped electrodes and the second electrode.

6. The capacitor of claim 5, wherein the second plate-shaped electrode is positioned between the two first plate-shaped electrodes.

7. The capacitor of claim 6, wherein two second plate-shaped electrode are provided, and positioned spaced apart from each other.

8. The capacitor of claim 7, wherein the two second plate-shaped electrodes are connected by an electrode connection portion.

9. The capacitor of claim 2, wherein the first plate-shaped electrode and the second plate-shaped electrode are provided in a plural quantity, and stacked interposing the plate-shaped dielectric layer.

10. The capacitor of claim 2, further comprising:
- a first external electrode disposed on the second insulation layer, and connected to the first electrode and the second plate-shaped electrode; and
- a second external electrode disposed on the second insulation layer, and connected to the second electrode and the first plate-shaped electrode.

11. The capacitor of claim 10, further comprising:
- a first external connection portion connecting the first external electrode and the second plate-shaped electrode; and
- a second external connection portion connecting the second external electrode and the first plate-shaped electrode.

12. The capacitor of claim 11, further comprising a conductive layer disposed within the first insulation layer, and connected to the first electrode.

13. The capacitor of claim 12, wherein the first external connection portion is connected to the conductive layer.

14. The capacitor of claim 12, wherein the first capacitor portion is disposed between the conductive layer and the second capacitor portion.

15. The capacitor of claim 1, wherein:
- a plurality of first capacitor portions are disposed on the substrate in different regions; and
- at least one second capacitor portion is disposed on each of the first capacitor portions.

16. The capacitor of claim 15, further comprising a conductive layer disposed within the first insulation layer, and connected to all of the first electrodes included in the plurality of first capacitor portions.

17. The capacitor of claim 16, further comprising:
- a plurality of first external electrodes disposed on the second capacitor portion;
- a plurality of second external electrodes disposed on the second capacitor portion; and
- a plurality of first external connection portions connected to each of the conductive layer and the plurality of first external electrodes by directly contacting.

18. The capacitor of claim 17, wherein:

each of a plurality of second capacitor portions is connected to at least one of the plurality of second external electrodes.

19. A method for manufacturing a capacitor, the method comprising:

forming a first insulation layer on a substrate;

forming a trench in the first insulation layer;

forming a first capacitor portion by forming a first electrode, a dielectric layer, and a second electrode in the trench; and forming a second capacitor portion having a first plate-shaped electrode and a second plate-shaped electrode inside a second insulation layer on the first capacitor portion.

20. The method of claim 19, wherein the first plate-shaped electrode and the second plate-shaped electrode are formed by a deposition process.

* * * * *